(12) United States Patent
Fan et al.

(10) Patent No.: US 9,971,904 B2
(45) Date of Patent: May 15, 2018

(54) METHOD AND SYSTEM FOR RANGE SEARCH ON ENCRYPTED DATA

(71) Applicant: Robert Bosch GmbH, Stuttgart (DE)

(72) Inventors: Xinxin Fan, Pittsburgh, PA (US); Boyang Wang, Tucson, AZ (US)

(73) Assignee: Robert Bosch GmbH, Stuttgart (DE)

( * ) Notice: Subject to any disclaimer, the term of this patent is extended or adjusted under 35 U.S.C. 154(b) by 0 days. days.

(21) Appl. No.: 15/273,870

(22) Filed: Sep. 23, 2016

(65) Prior Publication Data

US 2017/0091475 A1    Mar. 30, 2017

Related U.S. Application Data

(60) Provisional application No. 62/234,715, filed on Sep. 30, 2015.

(51) Int. Cl.

| H04L 29/06 | (2006.01) |
| G06F 21/62 | (2013.01) |
| G06F 17/30 | (2006.01) |
| G06F 21/60 | (2013.01) |
| H04L 9/00 | (2006.01) |

(52) U.S. Cl.
CPC .... *G06F 21/6218* (2013.01); *G06F 17/30011* (2013.01); *G06F 17/30619* (2013.01); *G06F 17/30637* (2013.01); *G06F 17/30657* (2013.01); *G06F 21/60* (2013.01); *G06F 21/62* (2013.01); *H04L 9/00* (2013.01); *H04L 63/0428* (2013.01); 
(Continued)

(58) Field of Classification Search
CPC ........... G06F 21/6218; G06F 17/30637; G06F 17/30619; G06F 21/60; G06F 17/30011; G06F 17/30657; G06F 21/62; G06F 2221/2107; H04L 63/0428; H04L 63/0435; H04L 9/00
USPC ........................................................ 713/165
See application file for complete search history.

(56) References Cited

U.S. PATENT DOCUMENTS

| 8,533,489 B2 * | 9/2013 | Roeder ............. G06F 17/30619 380/255 |
| 2003/0058268 A1 * | 3/2003 | Loui ................. G06F 17/30802 715/719 |

(Continued)

OTHER PUBLICATIONS

International Search Report corresponding to PCT Application No. PCT/EP2016/072937 (4 pages).
(Continued)

*Primary Examiner* — Mohammed Waliullah
(74) *Attorney, Agent, or Firm* — Maginot Moore & Beck LLP

(57) ABSTRACT

A method for searching encrypted data includes identifying, with a client, a plurality of values within a predetermined search range in a search index stored within a memory of the client, each value in the plurality of values being present in a plaintext representation of at least one encrypted file in a plurality of encrypted files stored in a server. The method further includes generating and transmitting at least one search query to the server through a data network, and receiving, with the client, at least one response from the server through the data network, the response including the encrypted keyword corresponding to the value in the plurality of values and an identifier of at least one file in the plurality of encrypted files stored on the server that includes the value.

16 Claims, 5 Drawing Sheets

(52) U.S. Cl.
CPC .. *H04L 63/0435* (2013.01); *G06F 2221/2107* (2013.01)

(56) References Cited

U.S. PATENT DOCUMENTS

2007/0174238 A1\* 7/2007 Sareen .............. G06F 17/30613
2013/0046974 A1\* 2/2013 Kamara ................... H04L 9/00
 713/165

OTHER PUBLICATIONS

Curtmola, Reza et al., "Searchable Symmetric Encryption: Improved Definitions and Efficient Constructions", pp. 1-33 (33 pages).
Wang, Boyang et al., "Tree-based Multi-Dimensional Range Search on Encrypted Data with Enhanced Privacy", pp. 1-25 (25 pages).
Wang, Cong et al., "Secure Ranked Keyword Search over Encrypted Cloud Data", 2010 International Conference on Distributed Computing Systems, pp. 253-262 (10 pages).
Popa, Raluca Ada et al., "An Ideal-Security Protocol for Order-Preserving Encoding", 2013 IEEE Symposium on Security and Privacy, pp. 463-477 (15 pages).
Boneh, Dan et al., "Conjunctive, Subset, and Range Queries on Encrypted Data", S.P. Vadhan (Ed.): TCC 2007, LNCS 4392, pp. 535-554, International Association for Cryptologic Research 2007 (20 pages).
Popa, Raluca Ada et al., "CryptDB: Protecting Confidentiality with Encrypted Query Processing", Symposium on Operating Systems Principles (SOSP'11), Oct. 2011, pp. 85-100 (16 pages).
Wang, Boyang et al., "Maple: Scalable Multi-Dimensional Range Search over Encrypted Cloud Data with Tree-based Index", Symposium on Information, Computer and Communications Security (ASIACCS'14), Jun. 2014, pp. 111-122 (12 pages).
Shi, Elaine et al., "Multi-Dimensional Range Query over Encrypted Data", 2007 IEEE Symposium on Security and Privacy (SP'07), pp. 1-15 (15 pages).
Kerschbaum, Florian et al., "Optimal Average-Complexity Ideal-Security Order-Preserving Encryption", Conference on Computer and Communications Security (CCS'14), Nov. 2014, pp. 275-286 (12 pages).
Boldyreva, Alexandra et al., "Order-Preserving Encryption Revisited: Improved Security Analysis and Alternative Solutions", P. Rogaway (Ed.): CRYPTO 2011, LNCS 6841, pp. 578-595 (18 pages).
Boldyreva, Alexandra et al., "Order-Preserving Symmetric Encryption", A. Jouz (Ed.): EUROCRYPT 2009, LNCS 5479, pp. 224-241 (18 pages).
Lu, Yanbin, "Privacy-Preserving Logarithmic-time Search on Encrypted Data in Cloud", The Network and Distributed System Security Symposium (NDSS), 2012, pp. 1-17 (17 pages).
Cash, David et al, "Dynamic Searchable Encryption in Very-Large Databases: Data Structures and Implementation", In Proc. of NDSS'14, 2014 (16 pages).
Cash, David et al., "Highly-Scalable Searchable Symmetric Encryption with Support for Boolean Queries", In Proc. of CRYPTO'13, 2013 (45 pages).
Kamara, Seny et al., "Parallel and Dynamic Searchable Symmetric Encryption", In Proc. of FC, 2013 (15 pages).
Kamara, Seny et al., "Dynamic Searchable Symmetric Encryption", In Proc. of ACM CCS'12, 2012 (24 pages).
Song, Dawn et al., "Practical Techniques for Searches on Encrypted Data", In Proc. of IEEE S&P'00, 2000 (12 pages).
Yavuz, Attila A., "Dynamic Searchable Symmetric Encryption with Minimal Leakage and Efficient Updates on Commodity Hardware", 2015, retrieved from https://eprint.iacr.org/2015/107.pdf (21 pages).
Wang, Boyang et al., "Maple: Scalable Multi-Dimensional Range Search over Encrypted Cloud Data with Tree-based Index," ASIA CCS'14, Jun. 4-6, 2014 (12 pages).
Popa, Raluca Ada et al., "An Ideal-Security Protocol for Order-Preserving Encoding," Proc. of the 34th IEEE Symposium on Security and Privacy, San Francisco, CA, May 2013 (20 pages).

\* cited by examiner

VALUE/FILE INDEX δ

| | $f_1$ | $f_2$ | $f_3$ | $f_4$ | $f_5$ | $f_6$ |
|---|---|---|---|---|---|---|
| 7 | 1 | 0 | 1 | 0 | 0 | 0 |
| 9 | 1 | 0 | 0 | 1 | 1 | 0 |
| 13 | 0 | 0 | 0 | 1 | 0 | 0 |
| 20 | 0 | 1 | 0 | 0 | 0 | 1 |

504

CUMULATIVE INDEX δ*

| | $f_1$ | $f_2$ | $f_3$ | $f_4$ | $f_5$ | $f_6$ |
|---|---|---|---|---|---|---|
| 7 | 0 | 0 | 1 | 0 | 0 | 0 |
| 9 | 1 | 0 | 1 | 1 | 0 | 0 |
| 13 | 2 | 0 | 1 | 2 | 1 | 0 |
| 20 | 2 | 1 | 1 | 2 | 1 | 1 |

508

ALTERNATE ENCODING OF CUMULATIVE INDEX δ*

| 7 | $\{I_1 \| 1, I_3 \| 1\}$ |
| 9 | $\{I_1 \| 2, I_3 \| 1, I_4 \| 1, I_5 \| 1\}$ |
| 13 | $\{I_1 \| 2, I_3 \| 1, I_4 \| 1, I_5 \| 1\}$ |
| 20 | $\{I_1 \| 2, I_3 \| 1, I_4 \| 2, I_5 \| 1\}$ |

METHOD AND SYSTEM FOR RANGE SEARCH ON ENCRYPTED DATA

CLAIM OF PRIORITY

This application claims priority to U.S. Provisional Application No. 62/234,715, which is entitled "Method and System for Range Search on Encrypted Data," and was filed on Sep. 30, 2015, the entire contents of which are hereby expressly incorporated by reference herein.

FIELD

This disclosure relates generally to the fields of information security, and, more particularly, to systems and methods that search for ranges of data within an encrypted set of data files.

BACKGROUND

Methods for performing searches of encrypted data that do not compromise the confidentiality of the encrypted data are known to the art. For example, in one common configuration a server computing device stores a large number of encrypted data files with an associated encrypted search index. One or more client computing devices make search requests to the server using encrypted representations of search keyword terms. Symmetric Searchable Encryption (SSE) is one method for performing searches in an encrypted search index that enables a client computing device that has access to a symmetric cryptographic key to perform searches for specific terms in the encrypted search index that is stored on the server. The server, however, only receives the encrypted search terms and cannot identify the content of the search terms based on the communications that are received from the client because the server does not have access to the (secret) cryptographic key required to decrypt the search terms.

Existing searchable encryption systems enable a client to search for a specific term or "keyword" in an encrypted search index. However, many searches that occur in practical systems perform searches within a range of values, and the prior art encrypted search schemes do not perform range searches efficiently. For example, a prior art encrypted search system can effectively search for the number 5,000 in an encrypted search index, but searching for a range of numbers such as 2,500 to 10,000 (inclusive) is an inefficient process since the client must perform 7,501 individual search operations (assuming only integer values) to fully cover the search range. The nature of the encrypted search index prevents the server from performing an efficient ranged search operation that would be used in a traditional search engine or database because doing so would compromise the confidentiality of the encrypted files that are stored on the server. Consequently, improvements to methods and systems for performing searches in encrypted data over a range of values would be beneficial.

SUMMARY

In one embodiment, a method for performing a search operation over a range of keyword values in encrypted data that are stored on an untrusted server computing device has been developed. The method includes identifying, with a client computing device, a plurality of values within a predetermined search range in a search index stored within a memory of the client computing device, each value in the plurality of values being present in a plaintext representation of at least one encrypted file in a plurality of encrypted files stored in a server computing device, generating, with the client computing device, at least one search query including an encrypted keyword corresponding to at least one value in the plurality of values within the predetermined search range, transmitting, with the client computing device, the at least one search query to the server computing device through a data network, and receiving, with the client computing device, at least one response from the server computing device through the data network, the response including the encrypted keyword corresponding to the value in the plurality of values and an identifier of at least one file in the plurality of encrypted files stored on the server computing device that includes the value.

In another embodiment, a system that performs a search operation over a range of keyword values in encrypted data that are stored on an untrusted server computing device has been developed. The system includes a network interface device configured to send and receive data through a data network, a memory, and a processor operatively connected to the network interface device and the memory. The processor is configured to identify a plurality of values within a predetermined search range in a search index stored within the memory, each value in the plurality of values being present in a plaintext representation of at least one encrypted file in a plurality of encrypted files stored in a server computing device, generate, at least one search query including asn encrypted keyword corresponding to at least one value in the plurality of values within the predetermined search range, transmit the at least one search query to the server computing device through the data network with the network interface device, and receive at least one response from the server computing device through the data network with the network interface device, the response including the encrypted keyword corresponding to the value in the plurality of values and an identifier of at least one file in the plurality of encrypted files stored on the server computing device that includes the value.

BRIEF DESCRIPTION OF THE DRAWINGS

FIG. 5 is a diagram of index tables and a cumulative search index that enables the client of FIG. 1 to perform efficient searches for ranges of data values that are stored in an encrypted form on the server.

DETAILED DESCRIPTION

For the purposes of promoting an understanding of the principles of the embodiments described herein, reference is now be made to the drawings and descriptions in the following written specification. No limitation to the scope of the subject matter is intended by the references. This patent also includes any alterations and modifications to the illustrated embodiments and includes further applications of the principles of the described embodiments as would normally occur to one skilled in the art to which this document pertains.

Definitions that pertain to the systems and methods described herein are set forth below. As used herein, the term "file" refers to any set of structured data that can be encrypted and stored in the memory of an untrusted server computing device. Examples of files include human or machine readable text and binary data, image data, video data, audio data, and other documents that are stored in a filesystem of a digital computing device. Additional examples of files include, for examples, individual rows or other subsets of tables that are stored within a relational database or other objects in a structured data store.

As used herein, the term "keyword" refers to a set of data corresponding to a value that is contained in one or more files. A search process identifies the value in the files. In particular, keywords correspond to values that cover a predetermined range such as a numeric range, alphabetical range, or any other range of sortable data values. A "plaintext" or "unencrypted" keyword refers to the value itself in a machine or human readable format while an encrypted keyword refers to a set of encrypted data that are generated using the value and a cryptographic key using a predetermined encryption process. As is described in more detail below, a server computing device that stores encrypted data receives a search query from a client computing device including at least one encrypted keyword. The server computing device retrieves identifiers and encrypted contents for encrypted files that include the value corresponding to the encrypted keyword and, in some embodiments, all encrypted files that include encrypted data corresponding to a range of values. However, the server computing device cannot determine the value of the original plaintext keyword based on the contents of the search query. A client computing device stores the cryptographic key and generates search queries for a server computing device including the encrypted keywords for data values in a predetermined range to perform a search for data values within the predetermined range that does not inform the server of the contents of the plaintext keywords or the plaintext files.

Figure 1:
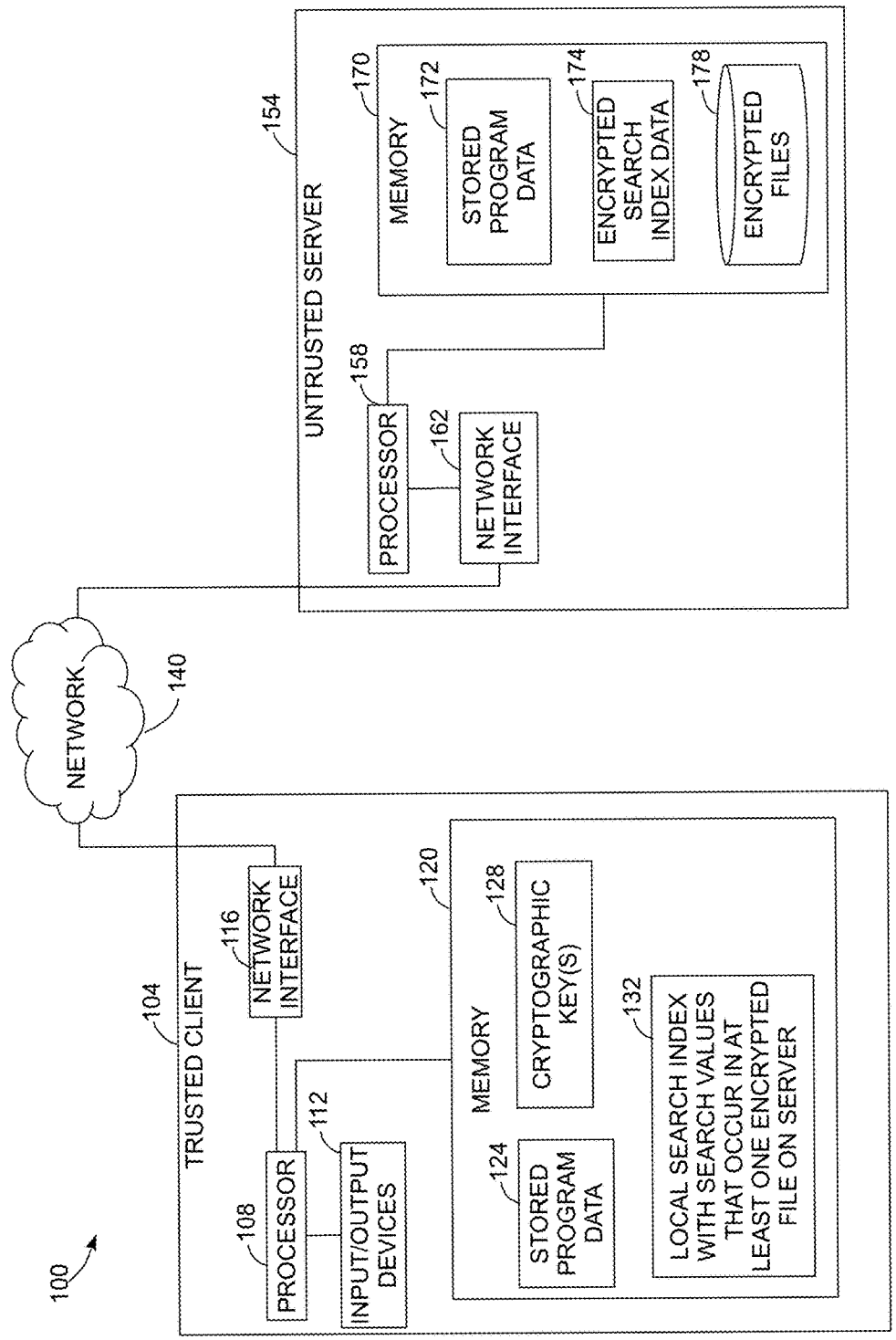
FIG. 1 is a schematic diagram of a system that implements symmetric searchable encryption (SSE) to enable a trusted client to perform range value searches in data that are stored in an encrypted form on an untrusted server.

FIG. 1 depicts one embodiment of a system 100 that includes a client computing device ("client") 104 and a server computing device ("server") 154. The client 104 is communicatively connected to the server 154 through a data network 140. The data network 140 is, for example, a local area network (LAN), a wide area network (WAN), or a combination of two or more LAN and WAN networks that enables bi-directional communication between the client 104 and server 154. In the system 100, the client computing device 104 is a "trusted" computing device meaning that the client 104 has access to cryptographic keys 128 that are described in more detail below. The cryptographic keys 128 enable the client 104 to encrypt data including both files and search index data that are used to search for keywords within encrypted files and to decrypt any of the encrypted data. The server 154 is considered to be "untrusted" in that the server 154 does not have access to the cryptographic keys 128 and the server 154 should not gain access to the plaintext (unencrypted) data in either of an encrypted search index 174 or encrypted file data 178. During the search operations that are described herein, the server 154 receives search query messages that are from the client 104 included encrypted keywords and transmits encrypted search results and optionally encrypted data files to the client 104 through the data network 140. However, the search operations prevent the server 154 from identifying the plaintext contents of either the search keywords used in the secure search process or the plaintext contents of any of the encrypted data files.

The client computing device 104 is a digital computing device that includes a processor 108, one or more input/output (I/O) devices 112, a network interface device 116, and a memory 120. The processor 108 is a digital logic device that includes, for example, one or more central processing unit (CPU) cores, graphical processing unit (GPU) cores, digital signal processing (DSP) units, and the like. In some embodiments the processor 108 includes multiple discrete processing devices, such as separate CPU and GPU components, while in other embodiments the processing devices are integrated into a single digital logic device in a System on a Chip (SoC) configuration. The I/O devices 112 include, for example, keyboards, mice, touch input devices, speech input devices, and audio/video output devices that enable a user to enter commands to control the client 104 and receive output information from the client 104. In particular, the client 104 performs searches in the encrypted data files that are stored in the server 154 and the I/O devices 112 enable a user to request searches for files that include keywords within predetermined ranges and to receive output from the client 104 with the results of the searches. The network interface device 116 is, for example, a wired or wireless network adapter that communicatively couples the client 104 to the server 154 through the data network 140.

The memory 120 includes one or more data storage devices including non-volatile data storage devices such as magnetic, optical, or solid-state drives and volatile data storage devices such as static and dynamic random access memory (RAM). In the configuration of FIG. 1, the memory 120 holds stored program instruction data 124, cryptographic key data 128, and a local search index 132 that stores an index of all the search values that are present in at least one of the encrypted files 178 that are stored in the server 154. The stored program data 124 includes one or more software programs that enable the client 104 to perform the operations described herein including, but not limited to, encrypting and decrypting file, keyword, and search index data, generating search indices, generating search queries for ranges of data values including encrypted search keywords, and decrypting search results and encrypted files that are received from the server 154. The cryptographic keys 128 include at least one set of secret data with a predetermined key size (e.g. 128 bits or 256 bits) that is known only to the client 104 and not to the server 154 or other third parties. The processor 108 generates the cryptographic keys using a secure key generation process that is otherwise known to the art and not described in further detail herein. The client 104 uses a symmetric encryption and decryption scheme that is otherwise known to the art for secure encryption and decryption of data, such as the advanced encryption system (AES), to encrypt and decrypt data including search keywords, search index data, and file data. For explanatory purposes, the embodiments described herein use a single cryptographic key K in the client 104 to encrypt and decrypt search keywords, search index data, and file data. However, embodiments of the system 100 that use multiple cryptographic keys, such as different keys for encryption/decryption of the search index data and for encrypting/decrypting the contents of data files, are also suitable for use with the processes described herein to perform searches over ranges of data values.

Figure 4:
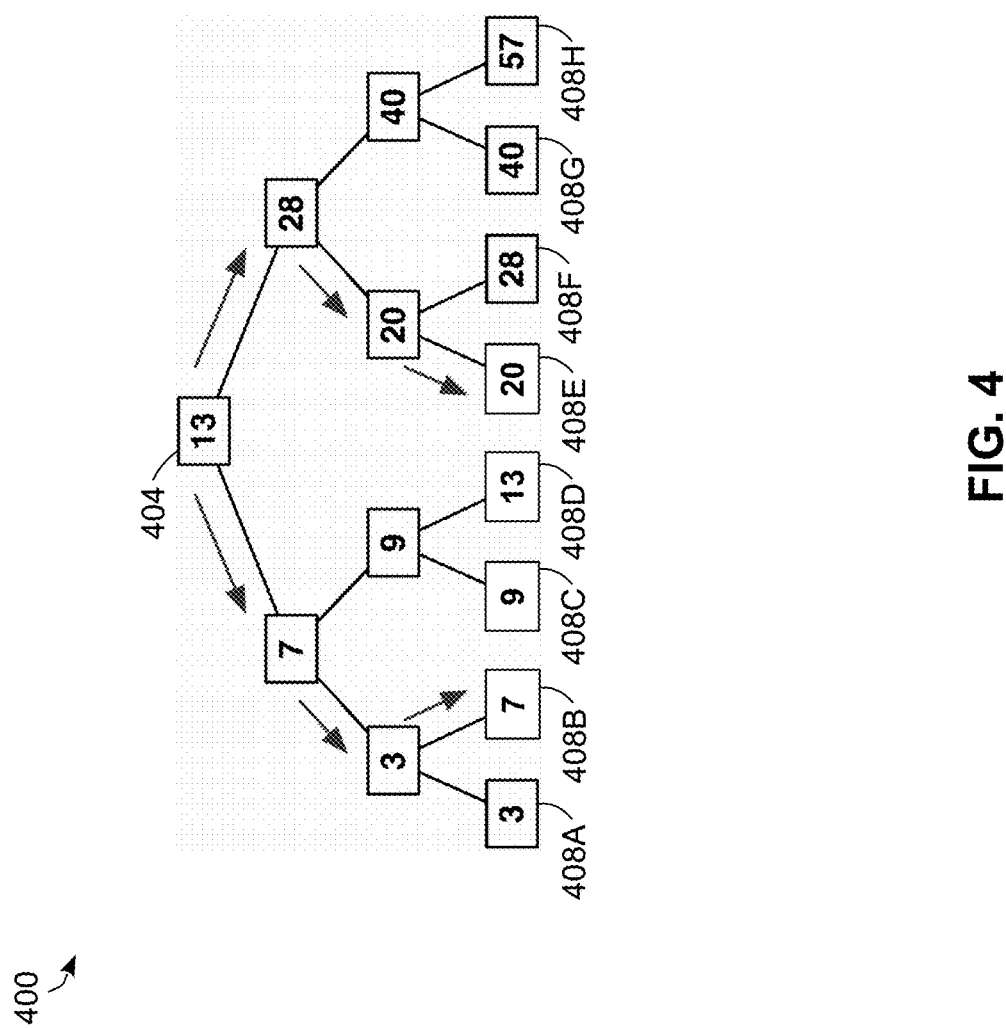
FIG. 4 is an illustrative depiction of a binary search tree that is stored in a memory device of the client of FIG. 1.

The local search index 132 is, for example, a binary search tree that stores a record of all values that correspond to keywords that are stored in at least one of the encrypted files 178 that are stored in the server 154. The client 104 stores the local search index 132 in the client memory 120 to enable identification of keyword values that are also present in at least one of the encrypted files 178 that are stored in the memory 170 of the server 154. FIG. 4 depicts an example of a binary search tree 400 with a set of numeric values in a range of 3 to 57. The binary search tree 400 includes a root node 404 and multiple child nodes where node has at most two child nodes. The binary search tree 400 stores values in a sorted order, such as an ascending numeric order that is depicted in FIG. 4, with the leaf nodes 408A-408H in the tree corresponding to keywords (numbers in this example) that are included in at least one of the encrypted files 178. In the embodiment of the system 100, the local search index 132 enables efficient identification of keyword values that lie within a predetermined search range because the values in the leaf nodes are stored in a sorted order. However, in alternative embodiments the local search index can include different tree structures, hash tables, and the like that enable the client 104 to identify values that both lie within the range to be searched and that are contained in at least one file in the encrypted file data 178.

When the client 104 performs a search that covers a range of values instead of just for a single value, the binary search tree 400 in the local search index 132 enables efficient identification of all the values that correspond to the range and that are actually included in at least one of the encrypted files 178. The local search index 132 is not merely a copy of the plaintext search index that the client generates as the basis for the encrypted search index 174 that is stored on the server 154. Instead, the local search index 132 only stores a single copy of any keyword value that is found in the plaintext data for any of the encrypted files, which consumes substantially less space in the memory 120 compared to the full search index that specifically identifies each file containing the keyword values.

The server computing device 154 is a digital computing device that includes a processor 158, a network interface device 162, and a memory 170. The processor 158, network interface device 162, and memory 170 are structurally similar to the processor 108, network interface 116, and memory 120 of the client 104, respectively, although in some embodiments the server 154 includes more computational and storage capacity than the client 104 to enable a single server 154 to provide services to a large number of clients that are each configured in the same manner as the client 104 in FIG. 1.

In the server 154, the memory 170 holds stored program instructions 172, encrypted search index data 174, and the encrypted files 178. The server 154 executes the stored program data 172 to implement the operations described herein including, but not necessarily limited to, processing search queries received from the client 104 to return encrypted search results from the encrypted search index 174, processing file requests from the client 104 to transmit selected encrypted file data 178 to the client 104, and storing encrypted search index and encrypted file data that are received from the client 104.

Figure 2:
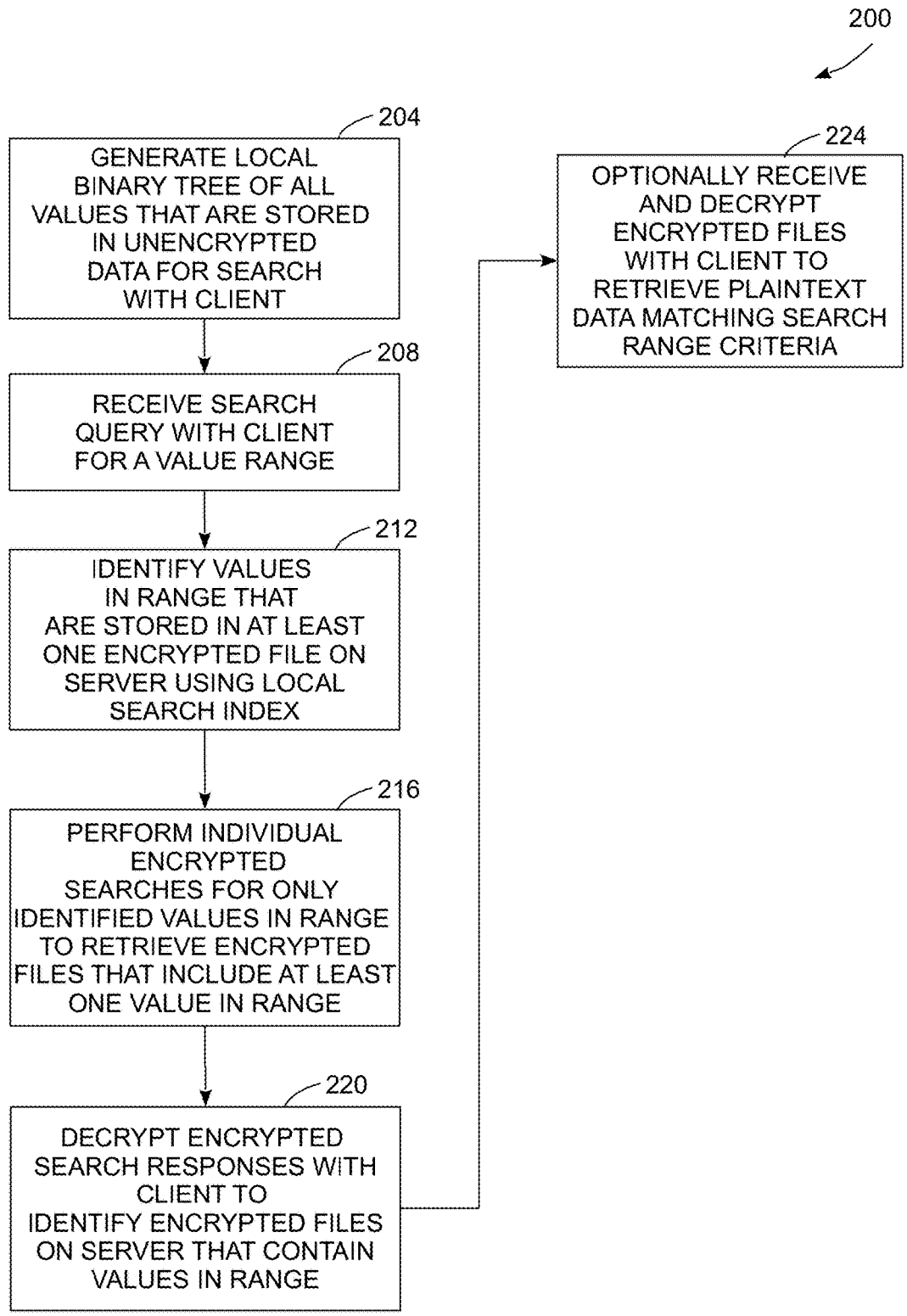
FIG. 2 is a block diagram of a process for performing a search of encrypted files over a range of search values.

FIG. 2 depicts a process 200 for performing a search operation for a range of values in encrypted data. In the description below, a reference to the process 200 performing an action or function refers to the operation of a processor to execute stored program instructions to implement the action or function in association with other components in a computerized device or network. The process 200 is described in conjunction with the system 100 of FIG. 1 for illustrative purposes.

The process 200 begins as the client generates the local search index 132 for storage in the memory 1020 (block 204). As described above, the local search index 132 in the client 104 is the binary search tree that includes an instance of each keyword value that is included in the encrypted search index 174 and the encrypted data files 178. To identify the keywords for the local search index and the full search, the client 104 processes plaintext data files to identify keywords in the data files that are subject to future searches through encrypted versions of the same data files using, for example, parsing and lexing software programs that are otherwise known to the art. The processor 108 in the client 104 generates the local search index based on the plaintext contents of the data files prior to encrypting the files and transmitting the encrypted files to the server 154. The client 104 also generates the encrypted search index data 174 and transmits the encrypted search index data 174 to the server 154 as is described in more detail below.

The client 104 generates the encrypted search index 174, encrypts the data files 178, and transmits the encrypted search index 174 and data files 178 to the server 154 prior to encrypted search operations. To generate the local search index and the full search, the client 104 processes plaintext data files to identify keywords in the data files that are subject to future searches through encrypted versions of the same data files using, for example, parsing and lexing software programs that are otherwise known to the art. FIG. 5 depicts a simple example of a plaintext search index in the form of a table 504 for a small set of search keyword values (numbers 7, 9, 13, and 20) for a set of six file identifiers that are represented as $f_1$-$f_6$. The search table 504 is a binary search table that indicates the presence of a search keyword in the file with a "1" or the absence from the file with a "0". Alternative embodiments optionally include additional search data such as the number of times that a keyword appears in a particular file and locations in the file where the keyword occurs.

In the system 100, the processor 108 in the client 104 encrypts the keywords entries in the search index and optionally the file identifiers in the search index to generate an encrypted search index using the cryptographic keys 128. The encrypted search index associates the encrypted versions of keywords with identifiers of the encrypted files that contain the keywords for use by the server 154 without enabling the server 154 to identify the contents of the keywords. In the process 200, the encrypted search index data 174 include, for example, a hash table or tree structure that maps one or more encrypted keywords to a set of data that identify the encrypted file or files that include each encrypted keyword. An encrypted file identifier is, for example, a filename of the encrypted file or if the file is a row in a database a key value for the database row that identifies the row without divulging content information about the data that are stored in the row.

The client 104 optionally uses the cryptographic keys 128 to encrypt the filename of the file itself in addition to encrypting the contents of the file since some filenames include information that should not be divulged to the server 154. The client 104 optionally encrypts each data set that identifies the encrypted files that contain or do not contain each keyword, such as encrypting the contents of each row of the table 504. In other embodiments, the identifiers for the encrypted files (not the contents of the encrypted files themselves) are stored in plaintext to enable the server 154 to identify and retrieve encrypted files without having to return the encrypted identifiers to the client 104 to be decrypted and to process a separate request for encrypted files. In the embodiment of FIG. 2, the contents of each search index are also encrypted to provide additional confidentiality in searches for encrypted keywords.

The client 104 transmits the encrypted search index data 174 and the encrypted files 178 to the server 154 prior to beginning the process 200. Those of skill in the art will recognize that encrypted search terms in an encrypted search index are not generally duplicated in the encrypted files themselves. For example, the encrypted keyword representation for the number 2,000 is not repeated in any encrypted file in the same manner as the number 2,000 would appear in a plaintext file since this information compromise the confidentiality of the encrypted data. Instead, the encrypted search index data 174 that the client 104 transmits to the server 154 includes identifiers for the files that contain the number 2,000. The server 154 performs a search process that only identifies the keyword using the index and does not directly search the encrypted contents of the files. The client 104 also encrypts the plaintext file data using the cryptographic keys 128 and a predetermined symmetric encryption scheme that is known to the art (e.g. AES or another suitable block cipher or stream cipher scheme) and transmits the encrypted files to the server 154. The client 104 can delete the original plaintext and encrypted files to provide additional capacity for file storage in the memory 120.

Referring again to FIG. 2, after generation of the local search index 132, the client 104 reuses the same local search index data for multiple keyword search operations. Consequently, the client 104 only needs to generate the local search index 132 or update an existing local search index to add or remove values in the binary search tree when the client 104 updates the contents of the encrypted files 178. The process 200 continues as the client 104 receives a search query for a range of keyword values (block 208). The client 104 receives the query via, for example, one of the input devices 112 from a user or as part of execution of a software program in the client 104 that generates a search query. Using the binary search tree example of FIG. 4 for illustrative purposes, an example of a range query requests system to search for and optionally retrieve all files that include values within a numeric range of 5 to 25. In this example, the search range includes a total of 21 values (inclusively).

The process 200 continues as the client 104 identifies values in the local search index 132 that are also within the specified search range (block 212). In the client 104, the processor 108 performs a binary search to identify a range of values that are within the specified search range. For example, in the binary search tree 400 the processor 108 traverses from the root node 404 to the leaf nodes 408B-408E to identify all of the values in the local search index 132 (values 7, 9, 13, and 20) that lie within the value search range of 5 to 25. In many practical embodiments the number of values within a specified search range that are actually present in the files is substantially smaller than the theoretical number of values, such as the four values in the leaf nodes 408B-408E compared to a theoretical numeric range of twenty-one values in the search ranges. In many configurations that include "sparse" data sets, the proportion of values that are actually present within a search range is substantially smaller (e.g. far less than 1%) than the total number of potential values within the full range.

The process 200 continues as the client 104 performs individual searches for each of the identified values in the range through the encrypted search index 174 that are stored on the server 154 (block 216). In the system 100, the processor 108 uses the network interface device 116 to transmit a plurality of search requests with each search request corresponding to one value that is present in both the value range and the local search index 132 to the server 154 through the data network 140. Each search request from the client 104 includes the encrypted representation of one keyword in the search range. For example, the processor 108 generates the encrypted search keywords based on the plaintext keyword values 7, 9, 13, and 20 using the cryptographic key 128 to produce each search query. The processor 158 in the server 154 receives the search requests via the network interface device 162 and retrieves entries from the encrypted search index data 174 that correspond to the encrypted keywords. The server 154 transmits the contents of the encrypted search index 174 to the client 154 via the data network 140 for each search query from the client that corresponds to only the values within the search range that are actually present in at least one of the encrypted files 178 that are stored on the server 154. During process 200, the client 154 does not generate and transmit search queries for values that are not present in the encrypted search index 174, which greatly reduces the processing and communication overheads for the client 104 and server 154 compared to a prior art search process that must search every value in the range.

In embodiment of FIG. 2, the server 154 stores the search index data 174 with encrypted entries. Thus, the processor 158 in the server 154 retrieves an encrypted set of data from the memory 170 that corresponds to the encrypted search keyword received from the client 104. During process 200, the processor 108 in the client 104 decrypts the encrypted search results using the cryptographic key 128 and identifies the encrypted files that include each search term (block 220). The server 154 then transmits the encrypted search results to the client 104, and the processor 104 in the client decrypts the search results using the cryptographic key 128. During the process 200, the processor 108 generates the final search results as a union of the decrypted search results for each of the plurality of values that are within the search range. In the illustrative example of FIG. 2, the processor 108 generates the search results as a union of all the file identifiers that are included in the decrypted search results for each of the values 7, 9, 13, and 20 for the search range of 5 to 25. In one configuration, the processor 108 generates a graphical output with a display output device 112 that displays the search results or other information based on the search results.

During the process 200, the client 104 optionally retrieves and decrypts one or more of the encrypted files 178 from the server 154 that are identified in the search results (block 224). The server 154 transmits the requested encrypted files 178 through the data network 140 and the client 104 receives the encrypted file data with the network interface device 116. The processor 108 decrypts the encrypted files using the cryptographic keys 128 and displays the files with the output device 112 or performs other processing using the decrypted file data as input. During process 200, the client 104 makes separate requests for one or more files to further preserve the confidentiality of the search results for a range of values since the server 154 does not have the opportunity to identify the exact files that correspond to each search query.

Figure 3:
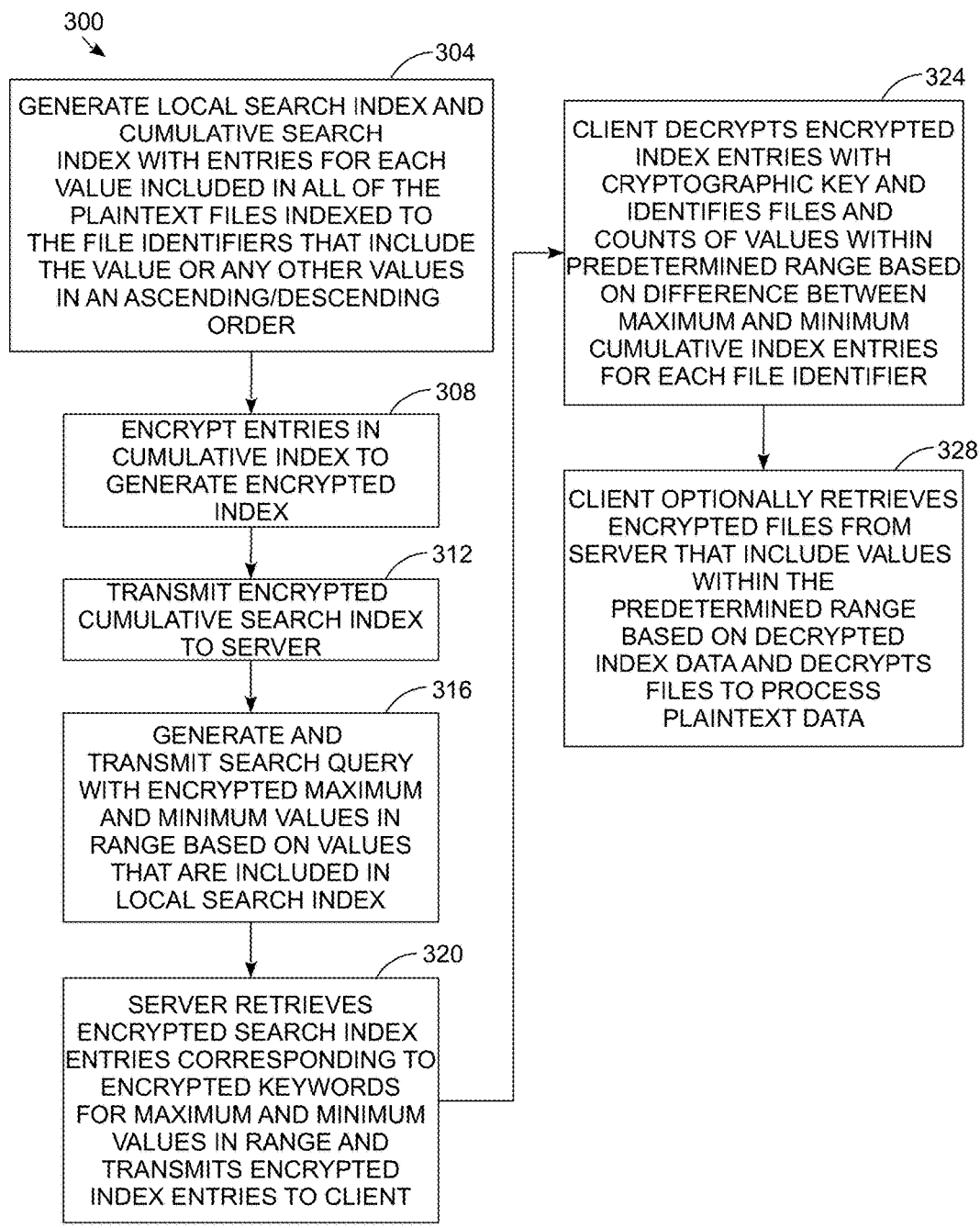
FIG. 3 is a block diagram of another process for performing a search of encrypted files over a range of search values.

FIG. 3 depicts another process 300 for performing a search operation for a range of values in encrypted data. In the description below, a reference to the process 300 performing an action or function refers to the operation of a processor to execute stored program instructions to implement the action or function in association with other components in a computerized device or network. The process 300 is described in conjunction with the system 100 of FIG. 1 for illustrative purposes.

During process 300, the client 104 generates a cumulative search index with a plurality of entries for each of the search keywords where the entry values correspond to a cumulative number of times that search keywords that are either less than or greater than the particular keyword have appeared in each file (block 304). The cumulative search index enables comparison of two sets of entries that correspond to the minimum and maximum values of a range search to identify files that include at least one value within the search range.

FIG. 5 depicts a cumulative search index 508 that the client 104 generates in more detail. In particular, the value/file index δ 504 includes an entry with a "1" to indicate that the one of the files $f_1$-$f_6$ includes the corresponding value (e.g. values 7, 9, 13, 20 in the simplified example of FIG. 5). To generate the cumulative index δ* 508, the processor 108 in the client 104 generates a table with the same keyword value entries from the index 504 (7, 9, 13, and 20) but each file entry includes a cumulative number of occurrences of any keyword value that is strictly less than the present keyword value. For example, in the index 504 for the file $f_1$ the values 7 and 9 each have an entry of "1" to indicate that these keyword values are present in the file $f_1$. The remaining entries for 13 and 20 have a value of "0" because these values are not present in the file $f_1$. However, the cumulative index 508 includes a value of "0" for keyword 7, "1" for keyword 9, and "2" for keywords 13 and 20 because, as noted above, each entry in the cumulative index corresponds to a cumulative value of the number of entries that are strictly less than the current entry within the file. Therefore, processor 108 assigns the entry for keyword 7, which is the lowest value in the index, a "0", the entry for keyword 9 a "1" value corresponding to the 7 keyword that is present in the file, and the keywords 13 and 20 each receive cumulative values of "2" as the processor 108 adds the keyword values for 7 and 9 to generate a cumulative value of "2" for the larger numbers.

Those of skill in the art should recognize that even though the number 7 is contained within the file $f_1$, the cumulative entry for the keyword 7 is "0" in the cumulative search index 508 because each entry only includes the number of times that a value that is strictly less than the entry value has occurred within the file, and there are no values that are strictly less than 7 in the file. However, as is depicted in more detail below, the value of 7 in the file $f_1$ can still be identified in search for a range of values that includes 7 because the search of the cumulative index table relies upon a difference between two entries in the cumulative table instead of upon the precise values of a single search index entry such as the search index 504. For the very largest entry in the table (keyword value 20), the system 100 does not encode the value in the cumulative index if only the highest keyword is included in a particular file, such as the file $f_2$, which includes the largest value 20 but no other values. In some embodiments, the client 104 generates the cumulative search index with the very largest value in the cumulative search index using a less than or equal to (≤) relationship to maintain a record of the files that include the largest keyword value.

While the tables of FIG. 5 depict cumulative tables and a cumulative search index that uses a less than relationship to accumulate entries with values that are smaller than each keyword value, those of skill in the art will recognize that another cumulative search index configuration uses a greater than relationship where each keyword value entry includes an accumulated number of occurrences of values that are greater than the keyword value. The search indices that are generated with the less than relationship are also referred to as "ascending" cumulative search indices since the entries accumulate as the keyword values increase and the greater than relationship search indices are referred to as "descending" cumulative search indices since the cumulative values increase as the keyword values decrease. Either type of cumulative search index is suitable for use in the process 300.

FIG. 5 also depicts another configuration of the cumulative index table 512. The table 512 includes the same contents as the cumulative index table 508 but each of the table entries corresponding to the keyword values are associated with a set of file identifiers to ($I_1$ to $I_6$ corresponding to the files $f_1$ to $f_6$) associated with the cumulative value for each file identifier. In some embodiment, the file identifiers $I_1$ to $I_6$ represent the encrypted file identifiers that the server 154 uses to access the encrypted files 178. Either representation of the cumulative index δ* using either index 508 or index 512 can be used with the process 300.

During process 300, the client 104 also generates the local search index 132 using, for example, a binary search tree in substantially the same manner as described above in the process 200. The client 104 stores the local search index 132 in the memory 120. In a similar manner to the process 200, the processor 108 in the client 104 generates the encrypted cumulative search index and encrypts the files using the cryptographic key 128 (block 308). The client 104 transmits only the encrypted cumulative search index and the encrypted files to the server 154 to enable search operations in the encrypted data without divulging the contents of the encrypted data to the server 154 block 312).

Process 300 continues as the client 104 generates and transmits a search query to the server 154 (block 316). In the process 300, the processor 108 in the client 104 receives a search request via an input device 112 that specifies a range of keyword values, such as the example search in a range of 8 to 15. The processor 108 uses the local search index 132 to identify a maximum keyword value and a minimum keyword value that correspond to the search range and that are contained in at least one of the encrypted files 178. For example, using the binary search tree 400 of FIG. 4 as an example, the processor 108 identifies the keyword value 9 at leaf node 408C as the minimum value and the keyword value 20 at leaf node 408E as the maximum value. The processor 108 does not necessarily identify the keywords corresponding to the exact minimum and maximum values of the search range because in many instances those values are not actually included in any of the encrypted files. Instead, the processor 108 identifies keywords that are included in the local search index 132 and that are included in at least one of the encrypted files 178. The keyword value 20 lies outside the search range of 8 to 15, but the cumulative index value for the value 20 in the encrypted search index data 174 covers the highest end of the search range. In one embodiment, the processor 108 uses a ceiling function to identify the keyword in the local search index 132 with the smallest keyword value that is greater than the largest value in the range of values specified in the search.

The processor 108 generates the search query including the encrypted keyword values for both of the keywords in the local search index 132 that correspond to the minimum and maximum values in the search range and transmits the query to the server 154 through the data network 140 using the network interface device 116. However, in the process 300 there is no requirement for the server 154 to be informed as to which encrypted keyword actually corresponds to the "maximum" or "minimum" value in a particular search. In the system 100, the processor 108 randomizes the order of the encrypted keywords in the search query to prevent the processor 158 in the server 154 from being able to determine which encrypted keywords correspond to the larger and smaller values in a range query.

Process 300 continues as the server 154 retrieves encrypted search index entries that correspond to the encrypted keywords for the maximum and minimum range values and transmits the encrypted search index entries to the client 104 (block 320). In the system 100, the processor 158 in the server 154 identifies two encrypted entries in the encrypted search index 174 based on the two encrypted keywords received from the client 104. The encrypted search index 174 includes entries with the same information as is depicted in the cumulative search index tables 508 and 512, but the client 104 encrypts the particular keyword values and contents of each entry (e.g. each row in the tables 508 and 512) prior to transmission to the server 154. The processor 158 in the server 154 transmits the encrypted entries to the client 104 through the data network 140 using the network interface device 162 without compromising the confidentiality of the encrypted search index data 174.

Process 300 continues as the client 104 decrypts the encrypted search results received from the server 154 and identifies the encrypted files that contain values within the search range based on a difference between the cumulative value for the maximum keyword search result entry and the minimum keyword search result entry (block 324). The processor 108 in the client 104 decrypts the encrypted search entries that are received from the server using the cryptographic key 128. Using the search range of 8 to 15 and the cumulative search table 508 as an example, the processor 108 identifies that the file $f_1$ includes one (1) instance of a keyword in the search range of 8 to 15 based on the difference between the cumulative search index entry (2) for the maximum keyword value (20) and the cumulative search index entry (1) for the minimum keyword value (9). This difference indicates that the file $f_1$ includes a single value within the search range. The processor 108 performs a similar subtraction operation to identify the differences in the cumulative index entries for the remaining file $f_2$-$f_6$. Any entries with a difference that is greater than zero correspond to a file that includes at least one keyword within the search range. The processor 108 identifies all the files that include the search keywords and optionally generates an output, such as a graphical listing of the files that match the search range, using the output device 112.

During the process 300, the client 104 optionally retrieves and decrypts one or more of the encrypted files 178 from the server 154 that are identified in the search results (block 328). The server 154 transmits the requested encrypted files 178 through the data network 140 and the client 104 receives the encrypted file data with the network interface device 116. The processor 108 decrypts the encrypted files using the cryptographic keys 128 and displays the files with the output device 112 or performs other processing using the decrypted file data as input. During process 300, the client 104 makes separate requests for one or more files to further preserve the confidentiality of the search results for a range of values since the server 154 does not have the opportunity to identify the exact files that correspond to each search query.

Both the processes 200 and 300 are examples of symmetric searchable encryption (SSE) methods since the processes 200 and 300 rely upon one or more symmetric cryptographic keys that are known only to the trusted clients to perform encryption and decryption operations to send search requests to an untrusted server that processes only encrypted data and does not identify the plaintext contents of search queries or of the encrypted files that are stored in the memory of the untrusted server. While some SSE methods are known to the art, both process 200 and process 300 perform searches over ranges of data values, such as the example numeric ranges that are presented above, more efficiently than prior art SSE methods. For example, to search over a range of values, a prior art SSE method performs an individual search for each value in the range, while the process 200 only requires performing an individual search for values that are actually contained in at least one file stored on the server 154 and the process 300 only requires performing a single search for the entire range.

The processes 200 and 300 both provide substantial improvements over the prior art in regards to the size of queries, which affects the network bandwidth requirements for performing search operations over value ranges, and in the processing time requirements for generating and processing the search queries. Table 1 presents the relative efficiencies of the prior art search methods and the methods that are described herein using big-O notation where S is the size of the range being searched, s is the number of individual values of the larger range S that are actually present in the encrypted files being searched, r is the number of files that are associated with a particular range query and m is the total number of distinct values that are stored in the local search index of the client where the prior art method does not have a local search index:

TABLE 1

|  | Search Time | Query Size | Query Generation/ Processing Time | Client Memory Requirements |
| --- | --- | --- | --- | --- |
| Prior art | O(S + r) | O(S) | O(S) | O(1) [no local search index] |
| Process 200 | O(s + r) | O(s) | O(log(m) + s) | O(m) |
| Process 300 | O(s + r) | O(1) | O(log(m)) | O(m) |

It will be appreciated that variants of the above-described and other features and functions, or alternatives thereof, may be desirably combined into many other different systems, applications or methods. Various presently unforeseen or unanticipated alternatives, modifications, variations or improvements may be subsequently made by those skilled in the art that are also intended to be encompassed herein in the following claims.

What is claimed:

1. A method for searching encrypted data comprising:
   identifying, with a client computing device, a plurality of values within a predetermined search range in a search index stored within a memory of the client computing device, each value in the plurality of values being present in a plaintext representation of at least one encrypted file in a plurality of encrypted files stored in a server computing device;
   generating, with the client computing device, at least one search query including an encrypted keyword corresponding to at least one value in the plurality of values within the predetermined search range, the at least one search query further comprising one search query including a first encrypted keyword corresponding to a minimum value in the plurality of values and a second encrypted keyword corresponding to a maximum value in the plurality of values;

transmitting, with the client computing device, the at least one search query to the server computing device through a data network;
receiving, with the client computing device, at least one response from the server computing device through the data network, the at least one response including a first encrypted entry corresponding to first encrypted keyword and a second encrypted entry corresponding to the second encrypted keyword, the first and second encrypted keywords each corresponding to a value in the plurality of values and an identifier of at least one file in the plurality of encrypted files stored on the server computing device that includes the value;
decrypting, with the client computing device, the first encrypted entry and the second encrypted entry using a cryptographic key stored in the memory; and
identifying, with the client computing device, at least one file in the plurality of encrypted files stored on the server computing device that includes at least one value between the minimum value and the maximum value based on a difference between a first cumulative index entry for the at least one file in decrypted data from the first entry and a second cumulative index entry for the at least one file in decrypted data from the second entry.

2. The method of claim 1 further comprising:
receiving, with the client computing device, the at least one file in the plurality of encrypted files stored on the server computing device that includes the value through the data network; and
decrypting, with the client computing device, the at least one file using a cryptographic key stored in the memory.

3. The method of claim 1, the generating of the at least one search query further comprising:
generating, with the client computing device, a plurality of search queries, each search query including one encrypted keyword corresponding to one value in the plurality of values;
transmitting, with the client computing device, the plurality of search queries to the server computing device through the data network; and
receiving, with the client computing device, a plurality of responses from the server computing device through the data network, each response including the encrypted keyword corresponding to one value in the plurality of values and an identifier of at least one file in the plurality of encrypted files stored on the server computing device that includes the one value.

4. The method of claim 3 further comprising:
receiving, with the client computing device, the plurality of responses from the server computing device through the data network, each response including an encrypted identifier of the at least one file in the plurality of encrypted files stored on the server computing device that includes the one value; and
decrypting, with the client computing device, the plurality of responses to identify a plaintext identifier of the at least one file using a cryptographic key stored in the memory.

5. The method of claim 1 further comprising:
receiving, with the client computing device, the at least one file in the plurality of encrypted files stored on the server computing device that includes the value through the data network; and
decrypting, with the client computing device, the at least one file using the cryptographic key stored in the memory.

6. The method of claim 1 further comprising:
identifying, with the client computing device, at least one file in the plurality of encrypted files stored on the server computing device that includes at least one value between the minimum value and the maximum value based on a difference between a first cumulative index entry for the at least one file in decrypted data from the first entry and a second cumulative index entry for the at least one file in decrypted data from the second entry.

7. The method of claim 1, the identifying of the plurality of values within the predetermined search range further comprising:
identifying, with the client computing device, the plurality of values corresponding to each value in the predetermined range that is present in at least one encrypted file in the plurality of encrypted files using a binary search tree stored in the memory of the client computing device.

8. The method of claim 1, the identifying of the plurality of values within the predetermined search range further comprising:
identifying, with the client computing device, only a maximum value and a minimum value in a binary search tree stored in the memory of the client computing device that correspond to the predetermined range.

9. A client computing device configured to perform encrypted searches comprising:
a network interface device configured to send and receive data through a data network;
a memory;
and a processor operatively connected to the network interface device and the memory, the processor being configured to:
identify a plurality of values within a predetermined search range in a search index stored within the memory, each value in the plurality of values being present in a plaintext representation of at least one encrypted file in a plurality of encrypted files stored in a server computing device;
generate, at least one search query including an encrypted keyword corresponding to at least one value in the plurality of values within the predetermined search range, the at least one search query further comprising one search query including a first encrypted keyword corresponding to a minimum value in the plurality of values and a second encrypted keyword corresponding to a maximum value in the plurality of values;
transmit the at least one search query to the server computing device through the data network with the network interface device;
receive at least one response from the server computing device through the data network with the network interface device, the at least one response including a first encrypted entry corresponding to first encrypted keyword and a second encrypted entry corresponding to the second encrypted keyword, the first and second encrypted keywords each corresponding to a value in the plurality of values and an identifier of at least one file in the plurality of encrypted files stored on the server computing device that includes the value;
decrypt the first encrypted entry and the second encrypted entry using a cryptographic key stored in the memory; and
identify at least one file in the plurality of encrypted files stored on the server computing device that includes at least one value between the minimum value and the maximum value based on a difference between a first cumulative index entry for the at least one file in decrypted data from the first entry and a second cumulative index entry for the at least one file in decrypted data from the second entry.

10. The client computing device of claim 9, the processor being further configured to:
   receive the at least one file in the plurality of encrypted files stored on the server computing device that includes the value through the data network with the network interface device; and
   decrypt the at least one file using a cryptographic key stored in the memory.

11. The client computing device of claim 9, the processor being further configured to:
   generate a plurality of search queries, each search query including one encrypted keyword corresponding to one value in the plurality of values;
   transmit the plurality of search queries to the server computing device through the data network with the network interface device; and
   receive a plurality of responses from the server computing device through the data network with the network interface device, each response including the encrypted keyword corresponding to one value in the plurality of values and an identifier of at least one file in the plurality of encrypted files stored on the server computing device that includes the one value.

12. The client computing device of claim 11, the processor being further configured to:
   receive the plurality of responses from the server computing device through the data network with the network interface device, each response including an encrypted identifier of the at least one file in the plurality of encrypted files stored on the server computing device that includes the one value; and
   decrypt the plurality of responses to identify a plaintext identifier of the at least one file using a cryptographic key stored in the memory.

13. The client computing device of claim 9, the processor being further configured to:
   receive the at least one file in the plurality of encrypted files stored on the server computing device that includes the value through the data network with the network interface device; and
   decrypt the at least one file using the cryptographic key stored in the memory.

14. The client computing device of claim 9, the processor being further configured to:
   identify at least one file in the plurality of encrypted files stored on the server computing device that includes at least one value between the minimum value and the maximum value based on a difference between a first cumulative index entry for the at least one file in decrypted data from the first entry and a second cumulative index entry for the at least one file in decrypted data from the second entry.

15. The client computing device of claim 9, the processor being further configured to:
   identify the plurality of values corresponding to each value in the predetermined range that is present in at least one encrypted file in the plurality of encrypted files using a binary search tree stored in the memory of the client computing device.

16. The client computing device of claim 9, the processor being further configured to:
   identify only a maximum value and a minimum value in a binary search tree stored in the memory of the client computing device that correspond to the predetermined range.

* * * * *